United States Patent Office 2,990,416
Patented June 27, 1961

2,990,416
STEROID COMPOUNDS

Raymond L. Pederson, Kalamazoo, and John C. Babcock, Portage Township, Kalamazoo County, Mich., assignors to The Upjohn Company, Kalamazoo, Mich., a corporation of Michigan
No Drawing. Filed June 2, 1958, Ser. No. 738,941
4 Claims. (Cl. 260—397.45)

The present invention relates to new steroids and is more particularly concerned with 4,17α-dialkyl-11-oxygenated testosterones, the corresponding 1-dehydro compounds, and 4,17α-dialkyl-11-oxygenated-17β-hydroxyandrostan-3-ones, intermediates in the production thereof and methods for the production thereof.

Novel steroids included in this invention and the process for the production therefor are represented by the following sequence of formulae:

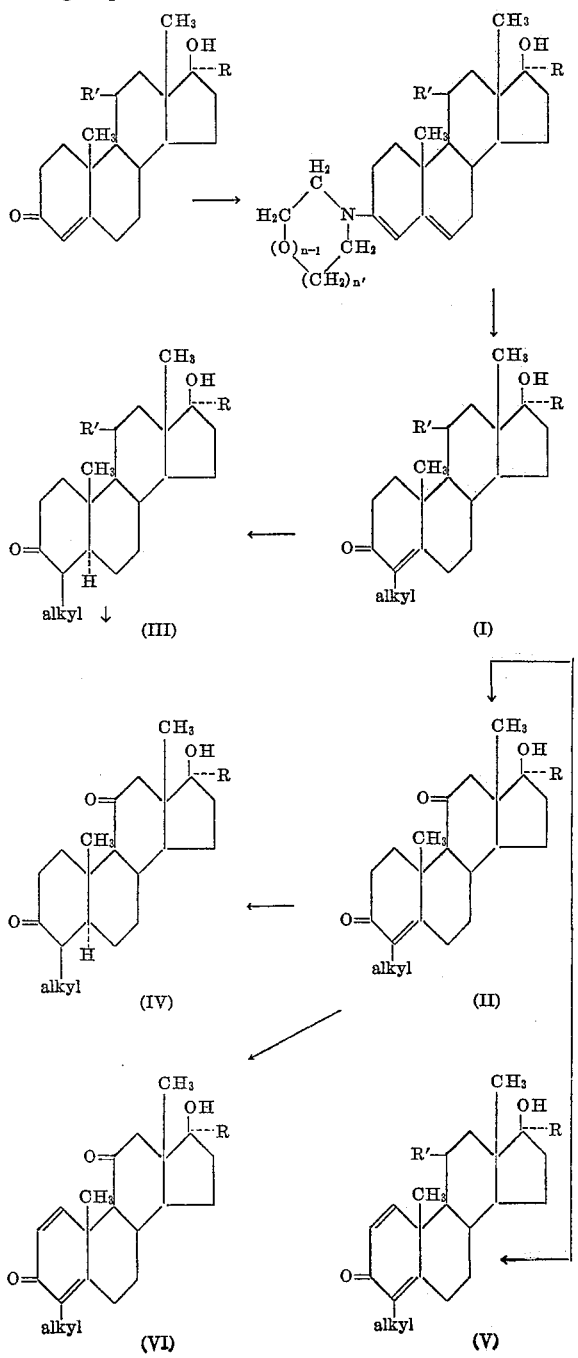

wherein R is an aliphatic hydrocarbon radical containing from one to six carbon atoms, inclusive, for example, methyl, ethyl, propyl, butyl, pentyl, hexyl, isopropyl, α-methallyl, and the like; $n$ and $n'$ are whole numbers from one to two, inclusive, R' is an α-hydroxy group or a β-hydroxy group, and wherein "alkyl" is a lower-alkyl radical containing from one to four carbon atoms, inclusive.

The 17-substituent, designated as R in the formulae of the foregoing reaction scheme, is referred to in this application as "alkyl." It is to be understood that the substituent has the value given hereinabove, i.e., an aliphatic hydrocarbon radical containing from one to six carbon atoms, inclusive, except in Formulae III and IV, wherein the value of R is that of an alkyl radical of the same chain length. This slight variation is because the compounds of Formulae III and IV are produced by hydrogenation means which saturate any unsaturated aliphatic R substituent as well as the A ring of the compounds.

The novel 4,17α-dialkyl-11-oxygenated testosterones and 4,17α-dialkyl-11-oxygenated-17β-hydroxyandrostan-3-ones of the present invention are useful as anabolic and androgenic agents with improved therapeutic ratio, progestational, anti-estrogenic, central nervous system regulating, gonadotropin inhibiting, steroid potentiating, uterine relaxant, and water and mineral regulating agents. The compounds of the present invention are particularly useful as anabolic agents and possess especial advantage, owing to their favorable anabolic-androgenic ratio, where clinical efficacy requires low relative androgenic activity.

For example, 4,17α-dimethyl-11β-hydroxytestosterone was found to have an oral anabolic activity of 61 percent of methyltestosterone and an androgenic activity of 8.6 percent of methyltestosterone, thus giving a favorable oral anabolic to androgenic ratio of 7:1. Parenterally, 4,17α - dimethyl - 11β - hydroxytestosterone was found to have an anabolic activity of twenty percent of testosterone propionate with no detectable androgenic properties. Similarly, 4β,17α-dimethyl-11β,17β-dihydroxyandrostan-3-one was found to have an oral anabolic activity of 25 percent of methyltestosterone with no detectable androgenic potency.

It can be readily seen that the anabolic-androgenic ratios of 4,17α-dimethyl-11β-hydroxytestosterone, and 4β,-17α-dimethyl-11β,17β-dihydroxyandrostan-3-one are considerably greater than that for methyltestosterone or testosterone propionate. Thus, when androgenic side effects are the limiting factor, a greater anabolic response can be obtained from 4,17α-dimethyl-11β-hydroxytestosterone, or 4β,17α-dimethyl-11β,17β-dihydroxyandrostan-3-one than from methyltestosterone or testosterone propionate at equivalent androgenic doses. This is particularly significant in pediatric and geriatric practice where appreciable androgenic effects are contraindicated.

The compounds of the present invention by virtue of their anabolic properties are useful in promoting retention of nitrogen (protein), increasing weight, restoring muscle strength, and increasing the sense of well being in debilitated patients. Their ability to increase erythropoiesis, as well, make them particularly useful in anemic conditions. The compounds of this invention, because of their favorable anabolic-androgenic ratio and high potency at suitable low doses, can effect these responses while producing no, or only a minimal androgenic response. The ability of these compounds to cause gain in weight gives to them the additional utility of being valuable additives to animal and poultry feeds.

The novel compounds of the present invention have decided advantage over many of the selective anabolic-androgenic compounds known in the prior art in that they are active when administered orally.

The compounds of the present invention also possess utility as starting materials for the preparation of the corresponding 1-dehydro compounds. These compounds can be produced by microbiological dehydrogenation of a 4,17α-dialkyl-11-oxygenated testosterone, represented by Formulae I and II, such as for example 4,17α-dimethyl-11α-hydroxytestosterone,
4,17α-dimethyl-11β-hydroxytestosterone,
4,17α-dimethyl-11-ketotestosterone,
4-methyl-17α-ethyl-11α-hydroxytestosterone,
4-methyl-17α-ethyl-11β-hydroxytestosterone,
4-methyl-17α-ethyl-11-ketotestosterone,
4-ethyl-17α-propyl-11-ketotestosterone,
4-isopropyl-17α-butyl-11β-hydroxytestosterone,
4-methyl-17α-(α-methallyl)-11β-hydroxytestosterone,
4-butyl-17α-pentyl-11α-hydroxytestosterone, and the like with *Septomyxa affinis*, A.T.C.C. 6737, following the fermentation conditions disclosed in U.S. Patent 2,602,769 to give the corresponding 1-dehydro compounds of 4,17α-dialkyl-11-oxygenated testosterone, represented by Formulae V and VI, such as for example, 1-dehydro-4,17α-dimethyl-11α-hydroxytestosterone,
1-dehydro-4,17α-dimethyl-11β-hydroxytestosterone,
1-dehydro-4,17α-dimethyl-11-ketotestosterone,
1-dehydro-4-methyl-17α-ethyl-11α-hydroxytestosterone,
1-dehydro-4-methyl-17α-ethyl-11β-hydroxytestosterone,
1-dehydro-4-methyl-17α-ethyl-11-ketotestosterone,
1-dehydro-4-ethyl-17α-propyl-11-ketotestosterone,
1-dehydro-4-isopropyl-17α-butyl-11β-hydroxytestosterone,
1-dehydro-4-methyl-17α-(α-methallyl)-11β-hydroxytestosterone,
1-dehydro-4-butyl-17α-pentyl-11α-hydroxytestosterone, and the like The 1-dehydro compounds of this invention, represented by Formulae V and VI, can also be produced by dehydrogenation with selenium dioxide. For example, 4,17α-dialkyl-11-oxygenated testosterones, represented by Formulae I and II, such as 4,17α-dimethyl-11α-hydroxytestosterone,
4,17α-dimethyl-11β-hydroxytestosterone,
4,17α-dimethyl-11-ketotestosterone,
4,17α-diethyl-11β-hydroxytestosterone,
4-methyl-17α-ethyl-11α-hydroxytestosterone,
4-methyl-17α-isopropyl-11-ketotestosterone,
4-butyl-17α-pentyl-11β-hydroxytestosterone,
4-methyl-17α-(α-methallyl)-11α-hydroxytestosterone,
4-ethyl-17α-(α-methallyl)-11-ketotestosterone, and the like, can be treated with selenium dioxide, as described in Example 6, to produce the corresponding 1-dehydro compounds of Formulae V and VI, as disclosed above for 1-dehydrogenation with Septomyxa.

The novel 1-dehydro compounds thus produced have gonadotropin inhibiting, progestational, anti-estrogenic, steroid potentiating, anabolic, central nervous system depressant, uterine relaxant, and water and mineral regulating properties.

The novel compounds of this invention can be prepared and administered to the animal organism in a wide variety of oral or parenteral dosage forms singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The process of the present invention comprises: treating 17α-alkyl-11α-hydroxytestosterone, or 17α-alkyl-11β-hydroxytestosterone with a secondary cyclic amine to produce the corresponding 3-enamine. The selected 3-enamine thus produced is then allowed to react with an alkylating agent to produce the corresponding 3-enamine of 4,17α-dialkyl-11α-hydroxytestosterone and 4,17α-dialkyl-11β-hydroxytestosterone, which on hydrolytic removal of the enamine yields 4,17α-dialkyl-11α-hydroxytestosterone, and 4,17α-dialkyl-11β-hydroxytestosterone, respectively, represented by Formula I. The 4,17α-dialkyl-11α-hydroxytestosterone, or 4,17α-dialkyl-11β-hydroxytestosterone thus produced can be oxidized with an oxidizing agent, such as chromic acid or the like to produce the corresponding 4,17α-dialkyl-11-ketotestosterone represented by Formula II.

Catalytic reduction of 4,17α-dialkyl-11α-hydroxytestosterone, 4,17α-dialkyl-11β-hydroxytestosterone and 4,17α-dialkyl-11-ketotestosterone, represented by Formulae I and II, respectively, using a suitable catalyst, such as palladium on charcoal, or the like, yields the corresponding 4β,17α-dialkyl-11α,17β-dihydroxyandrostan-3-one, 4β,17α-dialkyl-11β,17β-dihydroxyandrostan-3-one, and 4β,17α-dialkyl-17β-hydroxyandrostane-3,11-dione, represented by Formulae III and IV, respectively. The 4β,17α-dialkyl-17β-hydroxyandrostane-3,11-dione represented by Formula IV is also produced by oxidation of 4β,17α-dialkyl-11β,17β-dihydroxyandrostan-3-one or 4β,17α-dialkyl-11α,17β-dihydroxyandrostan-3-one represented by Formula III, using a suitable oxidizing agent, such as chromic acid and the like. The 4β-epimers thus produced can be converted by epimerization with a hydrogen halide, a mineral acid or a base to produce the corresponding 4α-epimers, 4α,17α-dialkyl-11α,17β-dihydroxyandrostan-3-one, 4α,17α-dialkyl-11β,17β-dihydroxyandrostan-3-one and 4α,17α-dialkyl-17β-hydroxyandrostane-3,11-dione, represented by Formulae III and IV, respectively.

The starting materials for the present invention can be prepared from 17α-alkyl-11-ketotestosterone and 11β-hydroxy-4-androstene-3,17-dione in accordance with the processes of U.S. Patent 2,735,854 by using the appropriate aliphatic Grignard reagent in the process disclosed in said patent. Illustrative of the starting materials for this invention are 17α-methyl-11β-hydroxytestosterone,
17α-ethyl-11β-hydroxytestosterone,
17α-propyl-11β-hydroxytestosterone,
17α-isobutyl-11β-hydroxytestosterone,
17α-hexyl-11β-hydroxytestosterone,
17α-(α-methallyl)-11β-hydroxytestosterone, and the like. Similarly, substituting 11α-hydroxy-4-androstene-3,17-dione in place of 11β-hydroxy-4-androstene-3,17-dione, the process disclosed in U.S. Patent 2,735,854 is productive of the corresponding 11α-hydroxy compounds, such as for example, 17α-methyl-11α-hydroxytestosterone, 17α-ethyl-11α-hydroxytestosterone, 17α-propyl-11α-hydroxytestosterone, 17α-(α-methallyl)-11α-hydroxytestosterone, and the like.

According to the process of the present invention, the ketone group at the 3-position of the starting material is converted to the corresponding 3-enamine derivative by reaction with a secondary cyclic amine. The enamine formation can be carried out in accordance with the disclosure of U.S. Patent 2,781,342. Amines which can be used are pyrrolidine, morpholine, homomorpholine, piperidine, C-alkyl substituted pyrrolidines, e.g., 2,4-dimthylpyrrolidine, 3-isopropylpyrrolidine, 3,3-dimethylpyrrolidine and the like. The preferred secondary amine is usually pyrrolidine. The selected amine is usually used in a molar excess, calculated on the starting steroid, to achieve the optimum yield of enamine product. Although large molar equivalent excesses of the amine can be employed in the reaction, the preferred proportion of amine to starting steroid is usually from about 1.1 to seven moles of amine per mole of steroid and especially from about 1.1 to two.

Moisture in the reaction is somewhat detrimental to the procurement of high yields of product, and preferred reaction conditions therefore include removal of the water formed during the enamine formation by known methods. The reaction is preferably conducted above room temperature, i.e., above about 25 degrees centigrade, e.g., between about 25 and 150 degrees centigrade. Reaction times can vary between about a few minutes to several days, depending in part upon the reaction solvent or solvents, ratio of reactants, selected amine, water removal and temperature.

Reaction solvents employed are benzene, toluene, xylene, chlorobenzene, pentane, hexane, methylene chloride, carbon tetrachloride, methanol, ethanol, tertiary butyl alcohol, tetrahydrofuran, dioxane, and the like.

The 3-enamine of the corresponding starting material thus produced is then alkylated in a dry inert organic solvent such as ethanol, methanol, isopropanol, butanol, ethyl acetate, chlorinated hydrocarbons, and the like with an excess of alkylating agent such as an alkyl halide to produce the 4-alkyl-3-enamine of the corresponding starting material. Alkyl halides thus employed are preferably those wherein the alkyl group has from one to four carbon atoms, inclusive, and the halogen is chlorine, bromine or iodine with bromine and iodine generally preferred. Representative alkyl halides include methyl, ethyl, propyl, isopropyl, butyl, isobutyl bromide and iodide and allyl bromide. The corresponding alkyl chlorides are also operative, but usually give somewhat inferior yields.

A preferred method is to treat the isolated and dried 3-enamine with an excess of methyl iodide in dry methanol and heat under reflux until the reaction is complete. At the end of the reflux period, the excess alkyl iodide is removed by distillation.

The 3-enamines of 4,17α-dialkyl-11β-hydroxytestosterone or 4,17α-dialkyl-11α-hydroxytestosterone thus produced can then be hydrolyzed with water, aqueous acid or base, or alkanol water mixtures. This treatment removes the 3-enamine group and results in regeneration of the Δ⁴-3-keto group in the steroid nucleus with production of the 4-alkyl derivative of the corresponding starting material.

A preferred method for the hydrolysis of the 3-enamine group is in a methanol-water solution containing from one to three percent sodium hydroxide, inclusive. The solution is heated under reflux for two hours and then concentrated by distillation at atmospheric pressure to remove most of the methanol present. The hydrolysis mixture is then diluted with water and extracted with ether, methylene chloride, benzene, toluene, hexane, or the like. The combined solvent extracts are then dried and the solvent removed by distillation giving the 4-alkyl derivative of the corresponding starting material. Illustrative of the compounds that can be prepared from the above-mentioned starting materials and shown in the above sequence of formulae as compounds of Formula I, are 4,17α-dimethyl-11β-hydroxytestosterone,
4,17α-dimethyl-11α-hydroxytestosterone,
4-methyl-17α-ethyl-11β-hydroxytestosterone,
4-methyl-17α-ethyl-11α-hydroxytestosterone,
4,17α-diethyl-11β-hydroxytestosterone,
4,17α-diethyl-11α-hydroxytestosterone,
4-ethyl-17α-propyl-11β-hydroxytestosterone,
4-propyl-17α-isobutyl-11α-hydroxytestosterone,
4-isopropyl-17α-butyl-11β-hydroxytestosterone,
4-butyl-17α-hexyl-11α-hydroxytestosterone,
4-methyl-17α-(α-methallyl)-11α-hydroxytestosterone,
4-methyl-17α-(α-methallyl)-11β-hydroxytestosterone,
and the like.

The resulting products can be purified by conventional procedures such as recrystallization or chromatography, or both.

The above-prepared 4-alkyl-11β-hydroxy steroids and 4-alkyl-11α-hydroxy steroids of Formula I can be oxidized to produce the corresponding 4-alkyl-11-keto steroids of Formula II. The oxidation can be carried out by a variety of methods, such as for example, by oxidizing the said 4-alkyl-11β-hydroxy steroids or 4-alkyl-11α-hydroxy steroids in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the oxidant is generally destroyed by addition of methyl alcohol, ethyl alcohol, and the like, for the chromic acid oxidant or a bisulfite for N-bromoacetamide, N-bromosuccinimide and other N-halo acyl amides and imides. Thereafter the resulting 4-alkyl-11-keto steroids are recovered by conventional means such as by precipitation with water or extraction with water-immiscible solvents, e.g., methylene chloride, ether, benzene, toluene, hexane, and the like, after which the solvent is then removed by distillation. The resulting product can be purified by recrystallization, chromatography, or both, yielding the 4,17α-dialkyl-11-keto steroids represented by Formula II of the above sequence of formulae. Illustrative of the compounds thus produced are 4,17α-dimethyl-11-ketotestosterone,
4-methyl-17α-ethyl-11-ketotestosterone,
4,17α-diethyl-11-ketotestosterone,
4-ethyl-17α-propyl-11-ketotestosterone,
4-propyl-17α-isobutyl-11-ketotestosterone,
4-isopropyl-17α-butyl-11-ketotestosterone,
4-butyl-17α-hexyl-11-ketotestosterone,
4-methyl-17α-(α-methallyl)-11-ketotestosterone, and the like.

The 4-alkyl-11α-hydroxy, 4-alkyl-11β-hydroxy and 4-alkyl-11-keto steroids, represented by Formulae I and II, respectively, can be saturated by hydrogenating the Δ⁴-double bond in the steroid nucleus. The hydrogenation of the Δ⁴-steroids can be carried out in the presence of a hydrogenation catalyst, such as palladium supported on charcoal, barium sulfate, zinc oxide, calcium carbonate, mercury salts, and the like, or mixtures thereof palladium on charcoal being preferred. The reaction is usually carried out in a solvent medium; alkanols, hexane, acetone, methyl ethyl ketone, dioxane, acetic acid, or the like organic solvent can be advantageously employed. Of these, tertiary butyl alcohol and 95 percent ethanol are preferred. The catalyst can be saturated with hydrogen prior to the introduction of the 4-alkyl-Δ⁴-steroid or, preferably the steroid, catalyst and supporting media can be contacted together in a solvent medium prior to introduction of the hydrogen.

It is not necessary to conduct the hydrogenation under pressure, although, when pressure is utilized, a hydrogen gauge pressure of about one to 100 pounds or more is operative, and a pressure of from about ten to 25 pounds is preferred. Any suitable temperature between about zero and 100 degrees centigrade can be employed, with room temperature being satisfactory. Hydrogenation is continued until approximately one molar equivalent of hydrogen has been absorbed. The catalyst is then separated from the solution by filtration and the hydrogenated products recovered by conventional separation or extraction procedures. The hydrogenated product can be purified chromatographically or by recrystallization from organic solvents or mixtures of the same conventionally used for the separation of steroids, thus yielding the corresponding 4,5-dihydro steroids of Formulae III and IV in the above sequence of formulae. Illustrative of the compounds thus produced are 4β,17α-dimethyl-11α,17β-dihydroxyandrostan-3-one,
4β-methyl-17α-diethyl-11α,17β-dihydroxyandrostan-3-one,
4β,17α-diethyl-11α,17β-dihydroxyandrostan-3-one,
4β-ethyl-17α-propyl-11α,17β-dihydroxyandrostan-3-one,
4β-propyl-17α-isobutyl-11α,17β-dihydroxyandrostan-3-one, 4β,17α-dimethyl-11β,17β-dihydroxyandrostan-3-one,
4β-methyl-17α-ethyl-11β,17β-dihydroxyandrostan-3-one,
4β,17α-diethyl-11β,17β-dihydroxyandrostan-3-one,
4β-isopropyl-17α-butyl - 11β,17β - dihydroxyandrostan-3-one,
4β-butyl-17α-hexyl-11β,17β-dihydroxyandrostan-3-one,
4β,17α-dimethyl-17β-hydroxyandrostane-3,11-dione,
4β-methyl-17α-ethyl-17β-hydroxyandrostane-3,11-dione,
4β,17α-diethyl-17β-hydroxyandrostane-3,11-dione,
4β-ethyl-17α-isopropyl - 17β - hydroxyandrostane-3,11-dione,
4β-tertiary butyl-17α-pentyl-17β-hydroxyandrostane-3,11-dione, and the like.

The 4β-epimers thus produced can be converted by epimerization to the 4α,17α-dialkyl-11-oxygenated-17β-hydroxyandrostan-3-ones. Conversion of the 4β-epimer can be accomplished by treatment at temperatures of zero degrees centigrade or slightly below in an organic solvent, such as chloroform, methylene chloride, ether, and the like and in the presence of a prototropic agent (a proton-donating reagent) such as alcohols, organic acids, and the like, with a hydrogen halide, for example, gaseous hydrogen chloride or an ethanol solution of aqueous hydrogen chloride. The mixture should be maintained at temperatures below room temperature, preferably near zero degrees centigrade, during the addition of the acid. The reaction mixture can then be washed with successive portions of dilute alkali water, and then dried and evaporated under reduced pressure. The crude 4α-alkyl products thus recovered from the reaction mixture can be purified by recrystallization.

Alternatively, the epimerization can be accomplished with an alkali. Bases such as for example, solutions of sodium hydroxide and potassium hydroxide may be used to treat the 4β-epimer in solution in an organic solvent, such as for example, methanol to produce the α-epimer.

Illustrative of the compounds thus produced are

4α,17α-dimethyl-11α,17β-dihydroxyandrostan-3-one,
4α-methyl-17α-ethyl-11α,17β-dihydroxyandrostan-3-one,
4α,17α-dimethyl-11β,17β-dihydroxyandrostan-3-one,
4α-methyl-17α-ethyl-11β,17β-dihydroxyandrostan-3-one,
4α,17α-dimethyl-17β-hydroxyandrostane-3,11-dione,
4α-methyl-17α-ethyl - 17β - hydroxyandrostane-3,11-dione
and the like.

The 4α,17α-dialkyl - 11α,17β - dihydroxyandrostan-3-ones, 4β,17α-dialkyl - 11α,17β - dihydroxyandrostan-3-ones, 4α,17α-dialkyl-11β,17β-dihydroxyandrostan-3-ones, and 4β,17α-dialkyl-11β,17α-dihydroxyandrostan - 3 - ones represented by Formula III can be oxidized by following the oxidation procedures hereinbefore described for the conversion of the 11β-hydroxy compounds of Formula I to the 11-keto compounds of Formula II, thus producing the corresponding 4α,17α-dialkyl-17β-hydroxyandrostane-3,11-dione and 4β,17α-dialkyl-17β-hydroxyandrostane-3,11-dione represented by Formula IV.

The compounds of this invention are also useful in preparing compounds represented by the following formula:

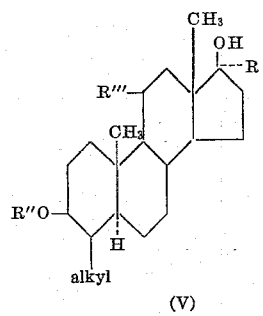

(V)

wherein R is an aliphatic hydrocarbon radical containing from one to six carbon atoms, inclusive, as disclosed above; R''' is α-hydroxy, β-hydroxy or keto; R'' is hydrogen or acyl, the acyl radical being of an organic carboxylic acid, preferably a hydrocarbon carboxylic acid containing from one to twelve carbon atoms, inclusive, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisolvaleric, succinic, a cyclic acid, e.g., cyclopropylideneacetic, cyclopentylformic, cyclopentylacetic, β-cyclohexylpropionic, cyclohexylformic, cyclohexylacetic, an aryl or alkaryl acid, e.g., benzoic, 2-, 3- or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic α-naphthoic, 3-methyl-α-naphthoic, an aralkyl acid, e.g., phenylacetic, phenylpropionic, diphenylacetic, triphenylacetic, an unsaturated acid, e.g., acrylic, maleic, vinylacetic, propiolic, undecolic, etc.; and wherein "alkyl" is a lower-alkyl radical containing from one to four carbon atoms, inclusive.

The compounds represented by Formula V are useful as anabolic and androgenic agents and possess especial advantage in cases where selective-anabolic acitivity is required owing to their favorable anabolic-androgenic ratio.

The compounds represented by Formula V, above, can be prepared from

4α,17α-dialkyl-11α,17β-dihydroxyandrostan-3-one,
4β,17α-dialkyl-11α,17β-dihydroxyandrostan-3-one,
4α,17α-dialkyl-11β,17β-dihydroxyandrostan-3-one, and
4β,17α-dialkyl-11β,17β-dihydroxyandrostan-3-one, represented by Formula III, by reduction using a suitable reducing agent such as lithium aluminum hydride, sodium borohydride, and the like to produce corresponding 4α,17α-dialkylandrostane-3β,11α,17β-triol,
4β,17α-dialkylandrostane-3β,11α,17β-triol,
4α,17α-dialkylandrostane-3β,11β,17β-triol and
4β,17α-dialkylandrostane-3β,11β,17β-triol.

The compounds thus produced can then be esterified under esterification conditions known in the art, e.g., by reaction with the selected acid anhydride or acid chloride or bromide of a hydrocarbon carboxylic acid or by reaction with the selected acid in the presence of an esterification catalyst or with an ester under ester-exchange reaction conditions. The corresponding 4α,17α-dialkylandrostane-3β,11α,17β-triol 3-acylate,
4β,17α-dialkylandrostane-3β,11α,17β-triol 3-acylate,
4α,17α-dialkylandrostane-3β,11β,17β-triol 3-acylate and
4β,17α-dialkylandrostane-3β,11β,17β-triol 3-acylate represented by Formula V thus produced can then be oxidized using a suitable oxidizing agent such as chromic acid in acetic solution to produce the corresponding 4α,17α-dialkyl-3β,17β-dihydroxyandrostan-11-one 3-acylate and 4β,17α-dialkyl-3β,17β-dihydroxyandrostan-11-one 3-acylate represented by Formula V. The 11-keto compounds thus produced can then be saponified in an alkaline solution, such as for example, sodium hydroxide, potassium carbonate, sodium bicarbonate, and the like to produce the corresponding 4α,17α-dialkyl-3β,17β-dihydroxyandrostan-11-one, and 4β,17α-dialkyl-3β,17β-dihydroxyandrostan-11-one represented by Formula V.

The following examples are illustrative of the process and products of the present invention, but are not to be construed as limiting.

EXAMPLE 1

4,17α-dimethyl-11β-hydroxytestosterone (1)

A solution containing ten grams of 17α-methyl-11β-hydroxytestosterone (U.S. Patent 2,735,854) in 110 milliliters of dry methanol was warmed to fifty degrees centigrade, and ten milliliters of pyrrolidine was added with stirring. On cooling, crystals separated from solution and were removed by filtration giving eleven grams of 3- pyrrolidyl enamine of 17α-methyl-11β-hydroxytestosterone melting at 175 to 179 degrees centigrade with decomposition.

A solution containing eleven grams of the 3-pyrrolidyl enamine of 17α-methyl-11β-hydroxytestosterone in 200 milliliters of dry methanol and 35 milliliters of methyl iodide was heated under reflux for a period of seventeen hours. The solution was concentrated by distillation to about 175 milliliters to remove the excess methyl iodide and then thirty milliliters of ten percent sodium hydroxide was added. The alkaline solution was heated at reflux for a period of two hours, and then concentrated by distillation to about fifty milliliters to remove most of the methanol. Then 100 milliliters of water was added and the reaction mixture was extracted successively with three 100-milliliter portions of methylene chloride. The combined extracts were washed with water, dried over sodium sulfate and concentrated to give 8.1 grams of a syrup. The syrup was dissolved in seventy milliliters of methylene chloride and diluted with 105 milliliters of Skellysolve B giving a precipitate which was removed by filtration. The mother liquor was chromatographed on 160 grams of synthetic magnesium silicate and eluted with acetone-Skellysolve B hexane mixture (180-milliliter fractions) as follows:

Fractions 1–21 __ 7:93 acetone-Skellysolve B hexane
Fractions 22–50 __ 10:90 acetone-Skellysolve B hexane The contents of fractions 35–44 exhibited ultraviolet absorption maxima between 249 and 252 mμ and were combined to give one gram of 4,17α-dimethyl-11β-hydroxytestosterone (I). Recrystallization from acetone gave 0.62 gram of an analytical sample melting at 219 to 221 degrees centigrade and having a rotation of $[\alpha]_D$ plus 120 degrees (chloroform). The ultraviolet absorption was $$\lambda_{max}^{alc.}\ 253\ m\mu,\ a_M\ 15{,}325$$

*Analysis.*—Calculated for $C_{21}H_{32}O_3$: C, 75.86; H, 9.70. Found: C, 75.90; H, 9.39.

Substituting as starting material other 17α-alkyl-11β-hydroxytestosterones and 17α-alkyl-11α-hydroxytestosterones, such as for example, 17α-ethyl-11β-hydroxytestosterone,
17α-propyl-11β-hydroxytestosterone,
17α-butyl-11β-hydroxytestosterone,
17α-isobutyl-11β-hydroxytestosterone,
17α-hexyl-11β-hydroxytestosterone,
17α-(α-methallyl)-11β-hydroxy-testosterone,
17α-methyl-11α-hydroxytestosterone,
17α-ethyl-11α-hydroxytestosterone,
17α-propyl-11α-hydroxytestosterone,
17α-butyl-11α-hydroxytestosterone,
17α-pentyl-11α-hydroxytestosterone,
17α-(α-methallyl)-11α-hydroxytestosterone, and using methyl iodide or other alkyl halides containing from one to four carbon atoms, inclusive, in place thereof, such as for example, ethyl bromide, propyl chloride, isopropyl iodide, butyl bromide, isobutyl iodide, tertiary butyl chloride, and the like in Example 1 above is productive of 4,17α-dialkyl-11β-hydroxytestosterones and 4,17α-dialkyl-11α-hydroxytestosterones represented by Formula I of this invention, such as 4-methyl-17α-ethyl-11β-hydroxytestosterone,
4,17α-diethyl-11β-hydroxytestosterone,
4-ethyl-17α-propyl-11β-hydroxytestosterone,
4-propyl-17α-isobutyl-11β-hydroxytestosterone,
4-isopropyl-17α-butyl-11β-hydroxytestosterone,
4-butyl-17α-hexyl-11β-hydroxytestosterone,
4-methyl-17α-(α-methallyl)-11β-hydroxytestosterone,
4-17α-dimethyl-11α-hydroxytestosterone,
4-methyl-17α-ethyl-11α-hydroxytestosterone,
4,17α-diethyl-11α-hydroxytestosterone,
4-ethyl-17α-propyl-11α-hydroxytestosterone,
4-isobutyl-17α-pentyl-11α-hydroxytestosterone,
4-methyl-17α-(α-methallyl)-11α-hydroxytestosterone,
and the like.

EXAMPLE 2

*4,17α-dimethyl-11-ketotestosterone (II)*

A solution is prepared containing 0.5 gram of 4,17α-dimethyl-11β-hydroxytestosterone (I), 0.15 gram of chromium trioxide, ten milliliters of glacial acetic acid and one-half milliliter of water. This mixture is stirred and maintained at room temperature for eight hours. Thereafter, excess oxidant is destroyed by the addition of methanol and the mixture is poured into fifty milliliters of ice water and the thus-obtained precipitate collected on a filter and recrystallized three times from ethyl acetate and Skellysolve B hexanes to give 4,17α-dimethyl-11-ketotestosterone, a light colored crystalline solid.

In the same manner other 4,17α-dialkyl-11β-hydroxytestosterones and 4,17α-dialkyl-11α-hydroxytestosterones represented by Formula I, such as for example, 4-methyl-17α-ethyl-11β-hydroxytestosterone,
4,17α-diethyl-11α-hydroxytestosterone,
4-ethyl-17α-propyl-11β-hydroxytestosterone,
4-propyl-17α-isobutyl-11β-hydroxytestosterone,
4-isopropyl-17α-butyl-11β-hydroxytestosterone,
4-butyl-17α-hexyl-11β-hydroxytestosterone, and
4-methyl-17α-(α-methallyl)-11β-hydroxytestosterone, when oxidized with chromium trioxide in acetic acid are productive of the other 4,17α-dialkyl-11-keto steroids of Formula II, such as for example, 4-methyl-17α-ethyl-11-ketotestosterone, 4,17α-diethyl-11-ketotestosterone, 4-ethyl-17α-propyl-11-ketotestosterone, 4-propyl-17α-isobutyl-11 - ketotestosterone, 4 - isopropyl-17α-butyl-11-ketotestosterone, 4-butyl-17α-hexyl-11-ketotestosterone, 4-methyl-17α-(α-methallyl)-11-ketotestosterone, and the like.

EXAMPLE 3

*4β,17α-dimethyl-11β,17β-dihydroxyandrostan-3-one (III)*

A mixture containing 0.5 gram of 4,17α-dimethyl-11β-hydroxytestosterone, 55 milliliters of tertiary butyl alcohol, and 100 milligrams of five percent palladium on charcoal as a catalyst was hydrogenated at a pressure of 15.8 pounds per square inch guage in a Parr hydrogenation apparatus. After 45 minutes the uptake of hydrogen ceased and the reaction mixture was removed from the apparatus and filtered through a diatomaceous filter aid to remove the catalyst. The filtrate was concentrated by distillation to a syrup which was dissolved in ether, again filtered and concentrated to give 0.17 gram of crystalline 4β,17α-dimethyl-11β,17β-dihydroxyandrostan-3-one (III), melting at 200 to 201 degrees centigrade. Recrystallization from methylene chloride-Skellysolve B hexanes gave 0.10 gram of a light colored crystalline solid having a melting point of 200 to 201 degrees centigrade and having a rotation of $[\alpha]_D$ plus seven degrees in chloroform.

*Analysis.*—Calculated for $C_{21}H_{34}O_3$: C, 75.40; H, 10.25. Found: C, 74.62, 74.47; H, 10.08, 10.10.

Substituting the other 4,17α-dialkyl-11β-hydroxytestosterones or 4,17α-dialkyl-11α-hydroxytestosterones of Formula I, such as for example, 4-methyl-17α-ethyl-11β-hydroxytestosterone,
4,17α-diethyl-11β-hydroxytestosterone,
4-propyl-17α-isobutyl-11β-hydroxytestosterone,
4-isopropyl-17α-butyl-11β-hydroxytestosterone,
4-butyl-17α-hexyl-11β-hydroxytestosterone,
4,17α-dimethyl-11α-hydroxytestosterone,
4-methyl-17α-ethyl-11α-hydroxytestosterone,
4,17α-diethyl-11α-hydroxytestosterone,
4-ethyl-17α-propyl-11α-hydroxytestosterone,
4-isobutyl-17α-pentyl-11α-hydroxytestosterone, as starting materials in Example 3 above is productive of other compounds represented by Formula III, such as 4β-methyl-17α-ethyl-11β,17β-dihydroxyandrostan-3-one,
4β,17α-diethyl-11β,17β-dihydroxyandrostan-3-one,
4β-propyl-17α-isobutyl-11β,17β - dihydroxyandrostan - 3-one,
4β-isopropyl-17α-butyl-11β,17β - dihydroxyandrostan - 3-one,
4β-butyl-17α-hexyl-11β,17β-dihydroxyandrostan-3-one,
4β,17α-dimethyl-11α,17β-dihydroxyandrostan-3-one,
4β-methyl-17α-ethyl-11α,17β-dihydroxyandrostan-3-one,
4β,17α-diethyl-11α,17β-dihydroxyandrostan-3-one,
4β-ethyl-17α-propyl-11α,17β-dihydroxyandrostan-3-one,
4β-isobutyl-17α-pentyl-11α,17β-dihydroxyandrostan-3-one, and the like.

EXAMPLE 4

*4β,17α-dimethyl-17β-hydroxyandrostane-3,11-dione (IV)*

A mixture containing 0.5 gram of 4,17α-dimethyl-11-ketotestosterone (II), 55 milliliters of tertiary butyl alcohol and 100 milligrams of five percent palladium on charcoal as a catalyst was hydrogenated at a pressure of about fifteen pounds per square inch guage in a Parr hydrogenation apparatus. After 45 minutes the uptake of hydrogen ceased and the reaction mixture removed from the apparatus and filtered through a diatomaceous filter aid to remove the catalyst. The filtrate was concentrated by distillation to a syrup which was dissolved in ether, again filtered and concentrated to give 4β,17α-dimethyl-11-keto-dihydroxytestosterone (IV). The product was purified by recrystallization from methylene chloride-Skellysolve B hexane.

Substituting the other 4,17α-dialkyl-11-ketotestosterones represented by Formula II, such as for example, 4-methyl-17α-ethyl-11-ketotestosterone,
4,17α-diethyl-11-ketotestosterone,
4-ethyl-17α-propyl-11-ketotestosterone,
4-propyl-17α-isobutyl-11-ketotestosterone,
4-isopropyl-17α-butyl-11-ketotestosterone and
4-butyl-17α-hexyl-11-ketotestosterone, as starting materials in Example 4, above, is productive of the compounds represented by Formula IV, such as for example, 4β-methyl-17α-ethyl-17β-hydroxyandrostane-3,11-dione,
4β,17α-diethyl-17β-hydroxyandrostane-3,11-dione,
4β-ethyl-17α-propyl-17β-hydroxyandrostane-3,11-dione,
4β-propyl-17α-isobutyl-17β-hydroxyandrostane - 3,11 - dione,
4β-isopropyl-17α-butyl-17β-hydroxyandrostane-3,11-dione,
4β-butyl-17α-hexyl-17β-hydroxyandrostane-3,11-dione, and the like.

EXAMPLE 5

*4α,17α-dimethyl-11β,17β-dihydroxyandrostan-3-one (III)*

A solution of 1.63 grams of 4β,17α-dimethyl-11β,17β-dihydroxyandrostan-3-one and 1.65 milliliters of absolute ethanol in 165 milliliters of chloroform is maintained at minus five to minus ten degrees centigrade for one-half hour while hydrogen chloride gas is bubbled through the solution. The reaction mixture is then poured into 300 milliliters of ice and saturated aqueous sodium bicarbonate. The organic layer is separated, washed with aqueous sodium bicarbonate, then with water, and dried over anhydrous sodium sulfate. The thus-obtained solution is chromatographed over Florisil synthetic magnesium silicate. Elution with acetone in Skellysolve B hexanes and recrystallization from methylene chloride-Skellysolve B hexanes gives 4α,17α-dimethyl-11β,17β-dihydroxyandrostan-3-one (III).

Substituting other 4β,17α-dialkyl-11β,17β-dihydroxyandrostan-3-ones, 4β,17α-dialkyl-11α,17β-dihydroxyandrostan-3-ones or 4β,17α-dialkyl - 17β - hydroxyandrostane-3,11-diones prepared in Examples 3 and 4, above, as starting material in Example 5, above, is productive of the corresponding 4α-alkyl compounds, such as for example, 4α-methyl-17α-ethyl-11β,17β-dihydroxyandrostan-3-one, 4α,17α-diethyl-11β,17β-dihydroxyandrostan-3-one, 4α - propyl - 17α - isobutyl - 11β,17β - dihydroxyandrostan-3-one, 4α,17α-dimethyl-11α,17β-dihydroxyandrostan-3-one, 4α - methyl - 17α - ethyl - 11α,17β - dihydroxyandrostan-3-one, 4α-ethyl-17α-propyl-11α,17β-dihydroxyandrostan-3-one, 4α,17α-dimethyl-17β-hydroxyandrostane-3,11 - dione, 4α - methyl - 17α - ethyl - 17β - hydroxyandrostane-3,11-dione, 4α-butyl-17α-hexyl-17β - hydroxyandrostane-3,11-dione, and the like.

EXAMPLE 6

*4β,17α-dimethyl-17β-hydroxyandrostane-3,11-dione (IV)*

A solution is prepared containing 0.5 gram of 4β,17α-dimethyl-11β,17β-dihydroxyandrostan-3-one (III), 0.5 gram of chromium trioxide, ten milliliters of glacial acetic acid and one-half milliliter of water. This mixture is stirred and maintained at room temperature for eight hours. Thereafter, excess oxidant is destroyed by the addition of methanol and the mixture is poured into fifty milliliters of ice water and the thus-obtained precipitate collected on a filter and recrystallized three times from ethyl acetate and Skellysolve B hexanes to give 4β,17α-dimethyl-17β-hydroxyandrostane-3,11 - dione. When the compounds represented by Formula III, such as for example, 4β-methyl-17α-ethyl-11β,17β-dihydroxyandrostan-3-one, 4β,17α-diethyl-11β,17β-dihydroxyandrostan-3-one, 4β - ethyl-17α - propyl - 11β,17β - dihydroxyandrostan-3-one, 4α,17α-dimethyl-11β,17β-dihydroxyandrostan-3-one, 4α - methyl - 17α - ethyl - 11β,17β-dihydroxyandrostan-3-one, 4α-propyl-17α-isobutyl-11β,17β-dihydroxyandrostan-3-one, 4β,17α - dimethyl - 11α,17β - dihydroxyandrostan-3-one, 4β-methyl-17α-ethyl-11α,17β-dihydroxyandrostan-3 - one, 4β - isopropyl - 17α - butyl - 11α,17β - dihydroxyandrostan-3-one, 4α,17α - dimethyl - 11α,17β - dihydroxyandrostan-3-one, 4α-methyl-17α-ethyl-11α,17β-dihydroxyandrostan-3-one and 4α-butyl-17α-hexyl-11α,17β - dihydroxyandrostan-3-one are substituted individually as starting material in Example 6 above, the process is productive of the corresponding 4,17α-dialkyl-17β-hydroxyandrostane-3,11-diones represented by Formula IV, such as for example, 4β-methyl-17α-ethyl-17β-hydroxyandrostane - 3,11 - dione, 4β,17α - diethyl - 17β - hydroxyandrostane - 3,11 - dione, 4β - ethyl - 17α - propyl - 17β - hydroxyandrostane - 3,11 - dione, 4α,17α - dimethyl - 17β-hydroxyandrostane-3,11-dione, 4α-methyl-17α-ethyl-17β-hydroxyandrostane-3,11-dione 4α-propyl - 17α - isobutyl-17β-hydroxyandrostane-3,11-dione,4β - isopropyl - 17α-butyl-17β-hydroxyandrostane-3,11-dione, 4α - butyl - 17α-hexyl-17β-hydroxyandrostane-3,11-dione, and the like.

EXAMPLE 7

*1-dehydro-4,17α-dimethyl-11β-hydroxytestosterone (V)*

A mixture of one gram of 4,17α-dimethyl-11β-hydroxytestosterone, (I) fifty milliliters of tertiary butyl alcohol, 0.5 milliliter of glacial acetic acid, and 0.4 gram of selenium dioxide was refluxed for 24 hours. An additional 0.4 gram of selenium dioxide was added and reflux was continued for another 24 hours. The reaction mixture was then concentrated in vacuo to about fifteen milliliters and extracted with ethyl acetate. The ethyl acetate extract was washed with cold, dilute, aqueous ammonium hydroxide solution, cold, freshly prepared aqueous ammonium sulfide solution, again with aqueous ammonium hydroxide solution, water, and finally dilute acid. The ethyl acetate extract was then dried over sodium sulfate, filtered and evaporated to dryness giving 0.55 gram of residue containing crude 1-dehydro-4,17α-dimethyl-11β-hydroxytestosterone. The residue was dissolved in methylene chloride, adsorbed on 35 grams of synthetic magnesium silicate, and eluted with 35 milliliter fractions of ten percent acetone in Skellysolve B hexanes. Fractions seventeen through 26, inclusive, were combined to give 0.29 gram of 1-dehydro-4,17α-dimethyl-11β-hydroxytestosterone. Recrystallization from acetone-Skellysolve B hexanes gave 227 milligrams of 1-dehydro-4,17α-dimethyl-11β-hydroxy-testosterone melting at 209 to 211 degrees centigrade and having a rotation of [α]$_D$ plus 51 degrees in chloroform, and infrared maxima in mineral oil mull of 1600, 1615, 3350, and 3440 reciprocal centimeters.

Substituting as starting material other 4,17α-dialkyl-11-oxygenated testosterones represented by Formulae I and II, such as for example, 4-methyl-17α-ethyl-11β-hydroxytestosterone,
4,17α-diethyl-11β-hydroxytestosterone,
4-propyl-17α-isobutyl-11β-hydroxytestosterone,
4-methyl-17α-(α-methallyl)-11α-hydroxytestosterone,
4,17α-dimethyl-11α-hydroxytestosterone,
4-methyl-17α-ethyl-11α-hydroxytestosterone,
4-butyl-17α-pentyl-11α-hydroxytestosterone,
4-methyl-17α-(α-methallyl-11α-hydroxytestosterone,
4,17α-dimethyl-11-ketotestosterone,
4-methyl-17α-ethyl-11-ketotestosterone,
4-isopropyl-17α-butyl-11-ketotestosterone, and
4-methyl-17α-(α-methallyl)-11-ketotestosterone, Example 6 above is productive of the corresponding 1-dehydro compounds represented by Formulae V and VI, such as 1-dehydro-4-methyl-17α-ethyl-11β-hydroxytestosterone,
1-dehydro-4,17α-diethyl-11β-hydroxytestosterone,
1-dehydro-4-propyl-17α-isobutyl-11β-hydroxytestosterone,
1-dehydro - 4 - methyl-17α-(α-methallyl) - 11β - hydroxytestosterone,
1-dehydro-4,17α-dimethyl-11α-hydroxytestosterone,
1-dehydro-4-methyl-17α-ethyl-11α-hydroxytestosterone,
1-dehydro-4-butyl-17α-pentyl-11α-hydroxytestosterone,
1-dehydro - 4 - methyl-17α-(α-methallyl) - 11α - hydroxytestosterone,
1-dehydro-4,17α-dimethyl-11-ketotestosterone,
1-dehydro-4-methyl-17α-ethyl-11-ketotestosterone,
1-dehydro-4-isopropyl-17α-butyl-11-ketotestosterone,
1-dehydro-4-methyl-17α - (α - methallyl) - 11 - ketotestosterone, and the like.

It is to be understood that the invention is not to be limited to the exact details shown and described, as obvious modifications and equivalents will be apparent to one skilled in the art, and the invention is therefore to be limited only by the scope of the appended claims.

We claim:
1. A 4,17α-dialkyl-11β-hydroxytestosterone represented by the following formula:

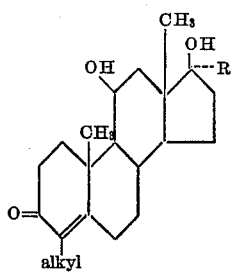

wherein R is an aliphatic hydrocarbon radical containing from one to six carbon atoms, inclusive, and wherein "alkyl" is a lower-alkyl radical containing from one to four carbon atoms, inclusive.

2. 4,17α-dimethyl-11β-hydroxytestosterone.
3. 4α,17α - dimethyl - 11β,17β - dihydroxyandrostan-3-one.
4. 4α,17α - dialkyl - 11β,17β - dihydroxyandrostan - 3-one wherein the 4-alkyl substituent is a lower-alkyl radical containing from 1 to 4 carbon atoms, inclusive, and the 17-alkyl substituent is an alkyl radical containing from 1 to 6 carbon atoms, inclusive.

References Cited in the file of this patent
UNITED STATES PATENTS

| | | |
|---|---|---|
| 2,660,586 | Murray et al. | Nov. 24, 1953 |
| 2,678,933 | Meister | May 18, 1954 |
| 2,695,907 | Murray | Nov. 30, 1954 |
| 2,697,110 | Murray | Dec. 14, 1954 |
| 2,735,854 | Herr | Feb. 21, 1956 |
| 2,766,264 | Bernstein | Oct. 9, 1956 |
| 2,837,464 | Nobile | June 3, 1958 |
| 2,838,533 | Ralls | June 10, 1958 |
| 2,842,570 | Herr | July 8, 1958 |
| 2,844,602 | Ringold et al. | July 22, 1958 |
| 2,864,831 | Eppstein et al. | Dec. 16, 1958 |
| 2,864,832 | Eppstein et al. | Dec. 16, 1958 |
| 2,881,191 | Herr | Apr. 7, 1959 |

UNITED STATES PATENT OFFICE
CERTIFICATE OF CORRECTION

Patent No. 2,990,416            June 27, 1961

Raymond L. Pederson et al.

It is hereby certified that error appears in the above numbered patent requiring correction and that the said Letters Patent should read as corrected below.

Column 3, line 36, for "dioxode" read -- dioxide --; column 4, line 62, for "2,4-dimthyl-" read -- 2,4-dimethyl- --; column 8, line 8, for "α-ethylisolvaleric" read -- α-ethylisovaleric --; column 13, line 18, for "-11α-" read -- -11β- --.

Signed and sealed this 23rd day of January 1962.

(SEAL)
Attest:

ERNEST W. SWIDER
Attesting Officer

DAVID L. LADD
Commissioner of Patents